(12) United States Patent
Huang et al.

(10) Patent No.: US 11,282,502 B2
(45) Date of Patent: Mar. 22, 2022

(54) METHOD FOR UTTERANCE GENERATION, SMART DEVICE, AND COMPUTER READABLE STORAGE MEDIUM

(71) Applicant: UBTECH ROBOTICS CORP LTD, Shenzhen (CN)

(72) Inventors: Rixing Huang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 17/006,936

(22) Filed: Aug. 31, 2020

(65) Prior Publication Data
US 2021/0134268 A1    May 6, 2021

(30) Foreign Application Priority Data

Nov. 4, 2019    (CN) .......................... 201911066310.2

(51) Int. Cl.
| | |
|---|---|
| *G10L 15/06* | (2013.01) |
| *G10L 15/18* | (2013.01) |
| *G10L 15/22* | (2006.01) |
| *G10L 25/84* | (2013.01) |
| *G10L 25/30* | (2013.01) |
| *G10L 19/16* | (2013.01) |

(52) U.S. Cl.
CPC ........ *G10L 15/063* (2013.01); *G10L 15/1815* (2013.01); *G10L 15/22* (2013.01); *G10L 19/167* (2013.01); *G10L 25/30* (2013.01); *G10L 25/84* (2013.01)

(58) Field of Classification Search
CPC .... G10L 15/063; G10L 15/1815; G10L 15/22
See application file for complete search history.

(56) References Cited

U.S. PATENT DOCUMENTS

| | | | |
|---|---|---|---|
| 10,664,662 B2* | 5/2020 | Awadallah | ............ G06F 40/216 |
| 2019/0236139 A1* | 8/2019 | DeFelice | ................. G06F 40/56 |
| 2019/0371299 A1* | 12/2019 | Jiang | ........................ G06N 5/00 |
| 2020/0019642 A1* | 1/2020 | Dua | .................... G06F 16/3347 |

(Continued)

OTHER PUBLICATIONS

Yadav, A., Shah, S., Xu, Z., Jacobs, D., & Goldstein, T. (2017). Stabilizing adversarial nets with prediction methods. arXiv preprint arXiv:1705.07364.*

(Continued)

*Primary Examiner* — Bryan S Blankenagel

(57) ABSTRACT

A computer-implemented method for utterance generation, a smart device, and a non-transitory computer readable storage medium are provided. The method includes: obtaining a first utterance to be answered, generating at least one random semantic vector, inputting the at least one random semantic vector and the first utterance into a trained generator, and obtaining at least one first answer outputted by the trained generator, wherein the trained generator is obtained based on a preset generative adversarial network. Due to the random semantic vector, even for the same utterance, the smart device can generate different answers corresponding to the different random semantic vectors, the possibility of generating too many identical answers during the human-machine conversation is reduced, and the fun during the human-machine conversation is enhanced.

20 Claims, 7 Drawing Sheets

(56) References Cited

U.S. PATENT DOCUMENTS

2020/0342879 A1* 10/2020 Carbune ................. G10L 17/22
2020/0364562 A1* 11/2020 Khoreva .............. G06K 9/6256
2021/0117733 A1*  4/2021 Mahto .................. G06K 9/6243

OTHER PUBLICATIONS

Oh, J. H., Kadowaki, K., Kloetzer, J., Iida, R., & Torisawa, K. (Jul. 2019). Open-domain why-question answering with adversarial learning to encode answer texts. In Proceedings of the 57th Annual Meeting of the Association for Computational Linguistics (pp. 4227-4237).*

* cited by examiner

METHOD FOR UTTERANCE GENERATION, SMART DEVICE, AND COMPUTER READABLE STORAGE MEDIUM

CROSS REFERENCE TO RELATED APPLICATIONS

This application claims priority to Chinese Patent Application No. CN201911066310.2, filed Nov. 4, 2019, which is hereby incorporated by reference herein as if set forth in its entirety.

BACKGROUND

1. Technical Field

The present disclosure generally relates to artificial intelligence technology, and particularly to a computer-implemented method for utterance generation, a smart device, and a non-transitory computer readable storage medium.

2. Description of Related Art

At present, how a machine responds to various queries raised by users is a particularly important matter during a human-machine conversation. Most smart devices can only generate a fixed answer when receiving the same utterance from the users during the human-computer interaction with the users, resulting in a monotonous human-computer interaction process between the smart device and the users.

BRIEF DESCRIPTION OF DRAWINGS

In order to more clearly illustrate the technical solutions in the embodiments of the present disclosure, the drawings used in the embodiments or the prior art description will be briefly introduced below, obviously, the drawings in the following description are only some embodiments of the present disclosure, and those skilled in the art without any creative labor can obtain other drawings according to the drawings.

DETAILED DESCRIPTION

In the following description, for the purpose of illustration rather than limitation, specific details such as a specific system structure and technology are provided, the embodiments of the present disclosure are thoroughly be understood. However, it should be clear to those skilled in the art that the present disclosure can also be realized in other embodiments without these specific details. In other cases, detailed descriptions of well-known systems, devices, circuits, and methods are omitted to avoid unnecessary details hindering the description of the present disclosure.

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

In general, the word "module," as used herein, refers to logic embodied in hardware or firmware, or to a collection of software instructions, written in a programming language, such as, Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media include compact discs (CDs), digital versatile discs (DVDs), Blu-Ray discs, Flash memory, and hard disk drives.

A computer-implemented method for utterance generation, a smart device, and a non-transitory computer readable storage medium provided by embodiments of the present disclosure can be applied to smart products that can interact with users, such as robots, smartphones, and tablets, etc., the following is to illustrate the technical solutions provided in the present disclosure through specific embodiments.

Figure 1:
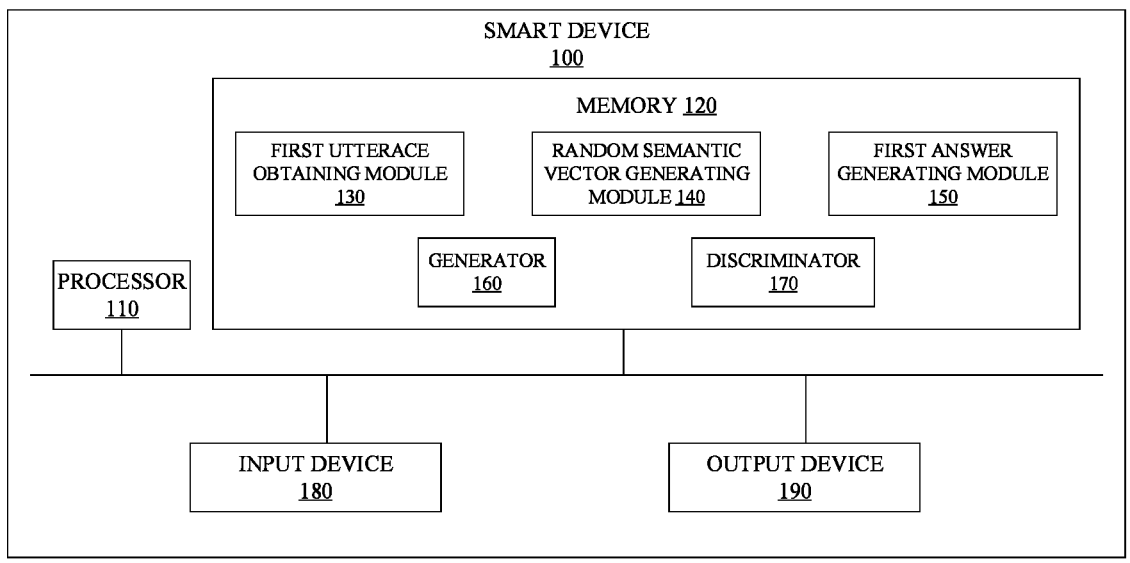
FIG. 1 is a block diagram of a simplified smart device for performing operations in accordance with the present disclosure.

FIG. 1 is a block diagram of a simplified smart device for performing operations in accordance with the present disclosure. The smart device 100 may be part of a multifunctional device, such as a mobile phone, a tablet computer, a personal digital assistant, a portable music/video player, a wearable device, a robot, or any other smart device. Smart device 100 may be connected to other electronic devices across a network, such as mobile devices, tablet devices, desktop devices, as well as network storage devices such as servers and the like. Smart device 100 may also be connected to other electronic devices via a wireless, or a wired connection. Smart device 100 may include a processor 110. The processor 110 may be a system-on-chip such as those found in mobile devices and include one or more central processing units (CPUs), dedicated graphics processing units (GPUs), or both. Further, the processor 110 may include multiple processors of the same or different type. The smart device 100 may also include a memory 120. The memory 120 may include one or more different types of memory, which may be used for performing device functions in conjunction with the processor 110. For example, the memory 120 may include any type of non-transitory storage device, such as cache, read only memory (ROM), random access memory (RAM), solid state storage device, etc. The memory 120 may store various programming modules during execution, including a first utterance obtaining module 130, a random semantic vector generating module 140, a first answer generating module 150, a generator 160, and a discriminator 170. Note, however, that the first utterance obtaining module 130, the random semantic vector generating module 140, the first answer generating module 150, the generator 160, and the discriminator 170 may be stored in memory other than memory 120, including in memory on other electronic devices. The first utterance obtaining module 130, the random semantic vector generating module 140, the first answer generating module 150, the generator 160, and the discriminator 170 may include separate executable programming modules in some embodiments, but the functionality of the programming module can be combined into a single programming module.

In one or more embodiments, the smart device 100 may also include an input device 180 and an output device 190. The input device 180, the output device 190, and the memory 120 are electrically coupled to the processor 110 by at least one bus. The input device 180 may be any kind of input device, such as radio frequency (RF) modules for receiving data, microphones for voice control input, touch screens for tactile input, or any combination thereof. The output device 190 may be any kind of output device, such as RF modules for sending data, speakers for audio data output, displays for visual data output, or any combination thereof. For example, the output device 190 may be any kind of display device, such as a liquid crystal display (LCD), a light emitting diode (LED) display, an organic LED (OLED) display, or the like. Further, the display device may be a traditional display or a semi-opaque display, such as a heads up display or the like. Further, the display may be part of a head-mounted display, according to one or more embodiments. Although the smart device 100 is depicted as comprising the numerous components described above, in one or more embodiments, the various components are distributed across multiple devices as part of a distributed system. Further, additional components may be used and some of the functionality of any of the components may be combined.

Figure 2:
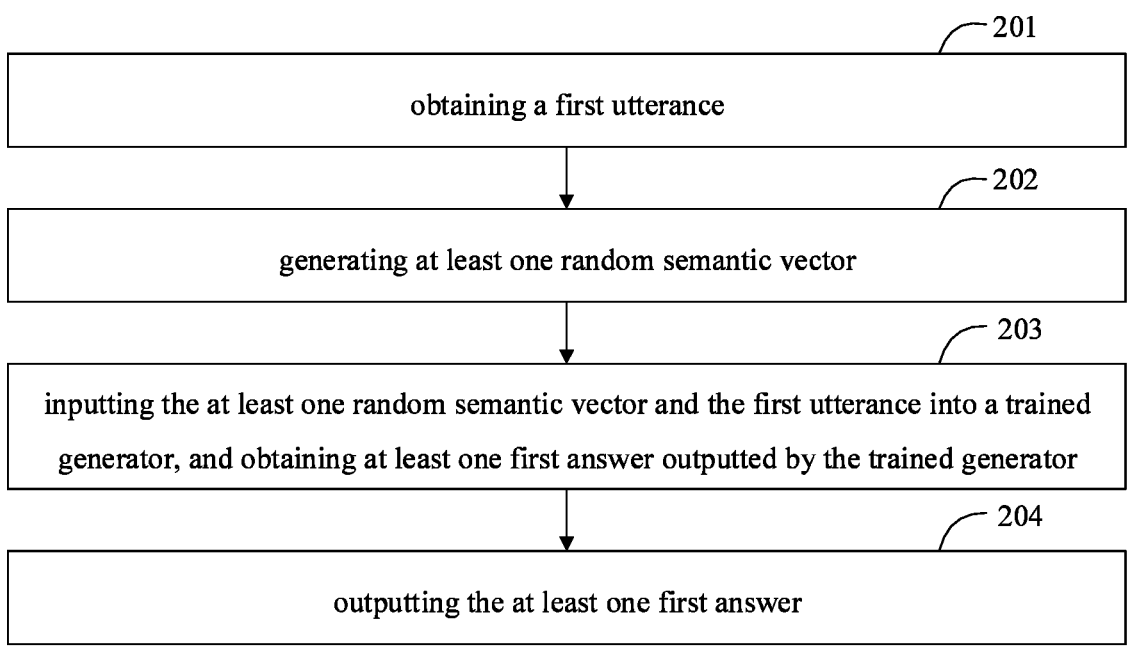
FIG. 2 is a flowchart of one embodiment of a computer-implemented method for utterance generation in accordance with the present disclosure.

FIG. 2 is a flowchart of one embodiment of a computer-implemented method for utterance generation in accordance with the present disclosure. The method may be embodied in the smart device 100, and is executed by functional modules such as those of FIG. 1. The method includes the following step 201 to step 204.

In step 201, obtaining a first utterance.

In the embodiment, the smart device 100 obtains the first utterance to be answered, by the input device 180. The first utterance refers to an utterance waiting for the smart device 100 to generate a corresponding answer. Optionally, the first utterance may be entered by a user. For example, the user enters the first utterance through a text, a voice, or other input methods. In one embodiment, the first utterance may be an utterance randomly grabbed from the internet by the smart device 100, when the smart device 100 is connected to the internet. There is no limitation on the way of obtaining the first utterance.

In step 202, generating at least one random semantic vector.

In the embodiment, the processor 110 of the smart device 100 generates a set of random numbers using a noise generator, and constructs the at least one random semantic vector based on the set of random numbers. Optionally, a dimension of the random semantic vector may be any value. Optionally, a dimension of a target vector is determined based on the first utterance, and the at least one random semantic vector matching the dimension of the target vector is generated. In the embodiment, the dimension of the random semantic vector is not limited.

In step 203, inputting the at least one random semantic vector and the first utterance into a trained generator, and obtaining at least one first answer outputted by the trained generator.

In the embodiment, the trained generator is trained and obtained based on a preset generative adversarial network. The processor 110 of the smart device 100 inputs the at least one random semantic vector and the first utterance into the trained generator, and the trained generator generates the at least one first answer corresponding to the at least one random semantic vector and the first utterance. That is, when utterances entered by the user are the same but the random semantic vectors are different, the smart device 100 can feedback different answers, so the fun during a human-machine conversation is greatly enhanced.

Figure 3:
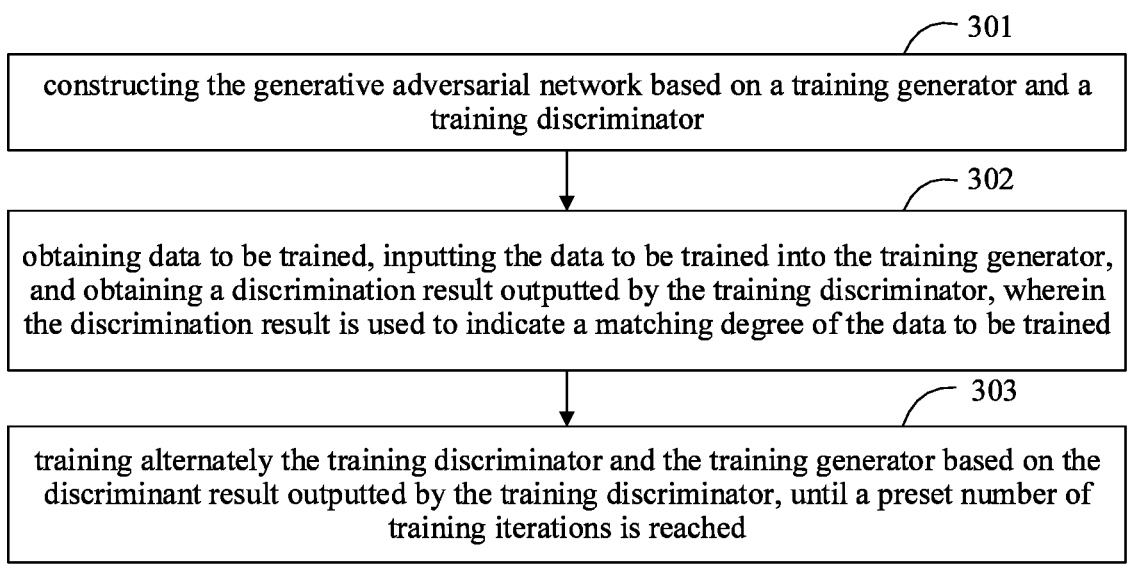
FIG. 3 is a flowchart of one embodiment of training a generator in the computer-implemented method for utterance generation in accordance with the present disclosure.

Specifically, the trained generator is trained and obtained based on the preset generative adversarial network, based on this, in one embodiment, a specific process for obtaining the trained generator by training is further provided. Referring to FIG. 3, a flowchart of one embodiment of training a generator in the computer-implemented method for utterance generation in accordance with the present disclosure. As shown in FIG. 3, the method further includes the following step 301 to step 303.

Figure 4:
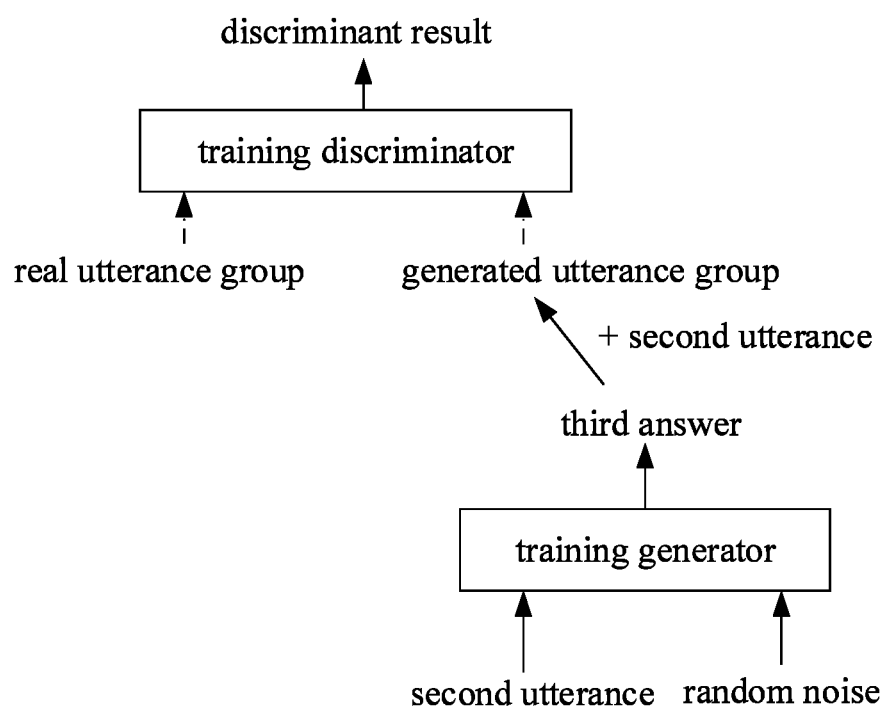
FIG. 4 is a schematic block diagram of one embodiment of a generative adversarial network used for training the generator in the computer-implemented method for utterance generation in accordance with the present disclosure.

In step 301, constructing the generative adversarial network based on a training generator and a training discriminator;

In the embodiment, the generative adversarial network includes a generator and a discriminator. The processor 110 of the smart device 100 constructs the generative adversarial network based on the training generator and the training discriminator. The training generator and the training discriminator are untrained. Referring to FIG. 4, a schematic block diagram of one embodiment of the generative adversarial network used for training the generator in the computer-implemented method for utterance generation in accordance with the present disclosure. An input of the training discriminator is constructed based on an output of the training generator, in the generative adversarial network. That is, the output of the training generator is input into the training discriminator.

In step 302: obtaining data to be trained, inputting the data to be trained into the training generator, and obtaining a discrimination result outputted by the training discriminator, wherein the discrimination result is used to indicate a matching degree of the data to be trained;

In the embodiment, the processor 110 sets several utterances to second utterances, and sets the corresponding answer of each of the second utterances to the second answer. The several utterances are preset by the user during the training. The data to be trained includes a set of the second utterances and a set of the second answers. The set of the second utterances is a set including the several second utterances, and the set of the second answers is a set including the several second answers. Specifically, the set of the second utterances can be expressed as $X=(X_1, X_2, X_3, \ldots, X_N)$, wherein $X_1, X_2, X_3$ to $X_n$ are different second utterances, that is, the second utterance in the set of the second utterances is expressed as $X_i$, and i is a positive integer less than N+1. The set of the second answers can be expressed as $Y=((Y_{11}, Y_{12}, Y_{13}, \ldots), (Y_{21}, Y_{22}, Y_{23} \ldots), (Y_{31}, Y_{32}, Y_{33} \ldots), \ldots, (Y_{N1}, Y_{N2}, Y_{N3} \ldots))$, wherein $Y_{11}, Y_{12}, Y_{13}$ etc., are different second answers corresponding to the second utterance $X_1$. $Y_{21}, Y_{22}, Y_{23}$ etc., are different second answers corresponding to the second utterance $X_2$. $Y_{31}, Y_{32}, Y2_3$ etc., are different second answers corresponding to the second utterance $X_3$. That is, assuming that the second utterance $X_i$ corresponds to a total of M second answers, the second answer corresponding to the second utterance $X_i$ is $Y_{ij}$, i is a positive integer less than N+1, and j is a positive integer less than M+1. It should be noted that in addition to the second utterances and the second answers corresponding to the second utterances, the data to be trained further includes at least one random noise.

Specifically, the step 302 includes: obtaining, by the processor 110, a second utterance and at least one second answer associated with the second utterance, wherein the second utterance is an utterance to be trained; generating, by the processor 110, at least one random noise; inputting, by the processor 110, the second utterance and the at least one random noise into the training generator, and obtaining at least one third answer outputted by the training generator; forming, by the processor 110, a real utterance group based on the second utterance and the at least one second answer; forming, by the processor 110, a generated utterance group based on the second utterance and the at least one third answer; and inputting, by the processor 110, the real utterance group and/or the generated utterance group into the training discriminator, and obtaining the discrimination result outputted by the training discriminator.

In order to better understand the step 302, the following takes a single second utterance, a single second answer, and a single random noise as an example to describe the step 302. In the example, the step 302 specifically includes following step 3021 to step 3026.

In step 3021, obtaining a second utterance and a second answer associated with the second utterance, wherein the second utterance is an utterance to be trained;

In step 3022, generating a random noise.

Specifically, the processor 110 obtains a second utterance from the set of the second utterances, obtains a second answer associated with the obtained second utterance from the set of the second answers, and generates a random noise by a noise generator.

In step 3023, inputting the second utterance and the random noise into the training generator, and obtaining a third answer outputted by the training generator.

In step 3024, forming a real utterance group based on the second utterance and the second answer.

In step 3025, forming a generated utterance group based on the second utterance and the third answer.

Specifically, the processor 110 inputs the second utterance and the random noise into the training generator, and obtains the third answer outputted by the training generator. That is, the third answer is not a preset answer in the training stage, but generated by the training generator in the process of continuous training. The second utterance and the second answer are combined into a first utterance group, the second answer is preset, the second answer matches the second utterance, so the first utterance group is set to the true utterance group. The second utterance and the third answer are combined into a second utterance group, the third answer is generated by the training generator, so the second utterance group is set to the generated utterance group.

In step 3026, inputting the real utterance group and/or the generated utterance group into the training discriminator, and obtaining a discrimination result outputted by the training discriminator.

Both the real utterance group and the generated utterance group include two utterances. That is, the real utterance group includes the second utterance and the second answer, and the generated utterance group includes the second utterance and the third answer. When training the training generator, the processor 110 only inputs the generated utterance group into the training discriminator. When training the training discriminator, the processor 110 inputs the real utterance group and the generated utterance group into the training discriminator in any order. The training discriminator includes at least one utterance matching mode, or the training discriminator consists of the at least one utterance matching model. After the two utterances of the real utterance group and the generated utterance group are inputted into the training discriminator, a score is outputted by the training discriminator. The highest score is 1, indicating that the two utterances match best, and the lowest score is 0, indicating that the two utterances do not match at all. That is, the discriminant result is reflected by the score.

In step 303, training alternately the training discriminator and the training generator based on the discriminant result outputted by the training discriminator, until a preset number of training iterations is reached.

The purpose of the training generator is to generate an answer that is difficult to be distinguished between true and false by the training discriminator, that is, after the generated utterance group is inputted into the training discriminator, the score outputted by the training discriminator is as close to 0.5 as possible. The purpose of the training discriminator is to identify as accurately as possible whether a current input utterance group is a real sample, that is, after the real utterance group is inputted into the training discriminator, the score outputted by the training discriminator is as close to 1 as possible, and after the generated utterance group is inputted into the training discriminator, the score outputted by the training discriminator is as close to 0 as possible. It can be seen that the training purpose of the training generator is the opposite to the training purpose of the training discriminator, and the training generator and the training discriminator are competing against each other. Specifically, when training the training generator, parameters of the training discriminator are fixed, the generated utterance group obtained by the training generator is inputted into the training discriminator, and parameters of the training generator are updated based on the discriminant results outputted from the training discriminator. When training the training discriminator, the parameters of the training generator are fixed, the generated utterance group obtained by the training generator and the real utterance group composed of the preset second utterance and the preset second answer are inputted into the training discriminator in any order, and the parameters of the training discriminator are updated based on the discriminant results outputted from the training discriminator. In the following, the process of alternately training the training generator and the training discriminator is further illustrated by a piece of pseudo code:

for number of training iteration do
    for k steps do
        sample minibatch of m noise sample $\{z_1, \ldots, z_m\}$ form z
        sample minibatch of m sample $\{(x_1, y_1), \ldots, (x_1, y_j), \ldots, (x_n, y_j), \ldots, (x_n, y_m)\}$ form (X, Y)
        updata D by ascending its stochastic gradient:

$$\nabla \frac{1}{m} \sum_{i=1}^{m} (\log D(x^i, y_1^i) + \log(1 - D(x^i, G(x^i, z^i))))(y_1^i \cdot is \cdot a \cdot label \cdot of \cdot x^i)$$

end for
sample minibatch of m noise sample $\{z_1, \ldots, z_m\}$ form z
updata G by descending its stochastic gradient:

$$\nabla \frac{1}{m} \sum_{i=1}^{m} (\log(1 - D(x^i, G(x^i, z^i)))).$$

end for

In the above pseudo code, number of training iteration represents the number of training iterations; D represents the discriminator, G represents the generator, $\{z_1, \ldots, z_m\}$ are several random noises, $\{(x_1, y_1), \ldots, (x_1, y_i), \ldots, (x_n, y_m), \ldots, (x_n, y_m)\}$ are several real utterance groups. When training the discriminator, not only the random noise is used (the random noise is used to generate the corresponding generated utterance group), but also the real utterance group is used, and the parameters of the discriminator are updated according to a preset stochastic gradient ascend algorithm. When training the generator, the real utterance group does not need to be used, only the random noise is used (the random noise is used to generate the corresponding generated utterance group), and the parameters of the generator are updated according to a preset stochastic gradient descent algorithm.

Figure 5:
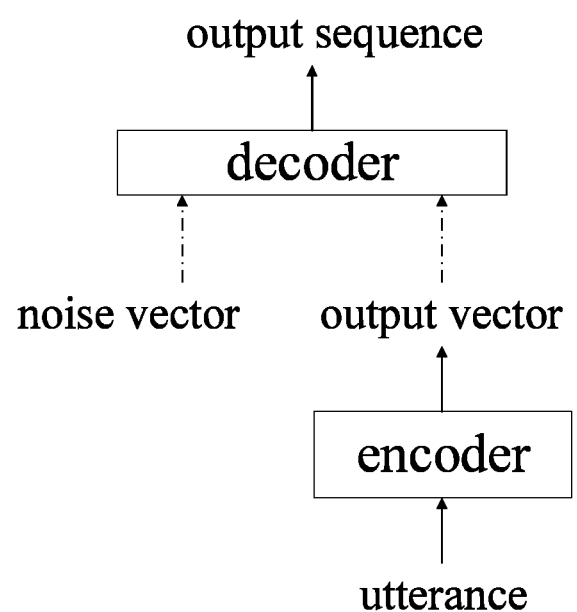
FIG. 5 is a schematic block diagram of one embodiment of the generator in the computer-implemented method for utterance generation in accordance with the present disclosure.

Optionally, above training generator includes at least one preset seq2seq (Sequence to Sequence) model, or the training generator consists of at least one preset seq2seq model. The preset seq2seq model can deal with the random noise, and the seq2seq model includes an encoder and a decoder. The random noise is one of the inputs of the training generator, in order to enable the preset seq2seq model to deal with the random noise, the preset seq2seq model needs to be modified. Referring to FIG. 5, a schematic block diagram of one embodiment of the generator (including the training generator and the trained generator) in the computer-implemented method for utterance generation in accordance with the present disclosure. As shown in FIG. 5, an utterance inputted into the generator is inputted into the encoder, the utterance is encoded by the encoder, and an output vector of the encoder is obtained. Then the output vector is inputted into the decoder, the random noise z is embedded into the decoder at the same time, and finally an output sequence is outputted by the decoder. The output sequence is an answer generated and obtained based on the utterance that is input into the training generator. The random noise z is a noise vector. There are many ways to embed the random noise z into the decoder, for example, the random noise z is added to the output vector of the encoder (the dimension of the noise vector z is the same as the dimension of the output vector of the encoder), or the noise vector z is spliced with the output vector of the encoder end-to-end. In the embodiment, the way of embedding the random noise z into the decoder is not limited. When the training of the training generator is completed, and the trained generator is used, the step 203 specifically includes: inputting, by the processor 110, the first utterance into the encoder, and obtaining an output vector of the encoder; inputting, by the processor 110, the output vector of the encoder and the at least one random semantic vector into the decoder, and obtaining output sequences of the decoder; and using, by the processor 110, the output sequences of the decoder as the at least one first answer outputted by the trained generator. In the process of generator training, the working process of the training generator includes: using the second utterance as the input of the encoder, and obtaining an output vector of the encoder; using the output vector of the encoder and the at least one random semantic vector as the input of the decoder, and obtaining output sequences of the decoder; and using the output sequences of the decoder as the at least one third answer outputted by the training generator.

In step 204, outputting the at least one first answer.

In the embodiment, the smart device 100 outputs the at least one first answer for the user, by the output device 190.

In the embodiment, the training generator and the training discriminator are trained alternately based on the generative adversarial network, the noise space (that is, the noise data) becomes the semantic space (that is, the semantic data) after the training generator is trained. That is, an utterance and a random noise are input into the trained generator, and a meaningful answer that matches the utterance is obtained. For example, when a user enters an utterance "what's the weather like today?", if the noise random semantic vector is "exercise", the output answer may be "it's too hot for strenuous exercise today", and if the noise random semantic vector is "clothing", the output answer may be "it's very cold today, are you sure you don't want a coat?". The trained generator can be well applied to the chatting human-computer interaction system, and can generate different answers corresponding to the same utterance entered by the user under different situations or contexts, the possibility of generating too many identical answers during the human-machine conversation is effectively reduced, and the fun during the human-machine conversation is enhanced.

Figure 6:
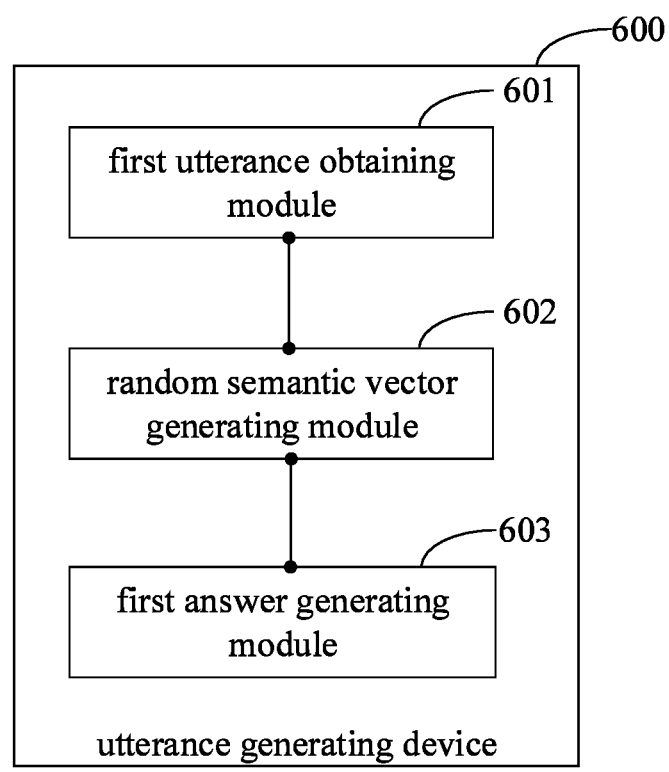
FIG. 6 is a block diagram of one embodiment of an utterance generating device in accordance with the present disclosure.

FIG. 6 is a block diagram of one embodiment of an utterance generating device in accordance with the present disclosure. For convenience of description, only parts related to the embodiment of the present invention are shown. In the embodiment, the utterance generating device is installed in a smart device, such as the smart device 100 shown in FIG. 1. As shown in FIG. 6, the utterance generating device 600 includes a first utterance obtaining module 601, a random semantic vector generating module 602, and a first answer generating module 603.

The first utterance obtaining module 601 is used for obtaining, by the input device, a first utterance, wherein the first utterance is an utterance to be answered.

The random semantic vector generating module 602 is used for generating at least one random semantic vector.

The first answer generating module 603 is used for inputting the at least one random semantic vector and the first utterance into a trained generator, obtaining at least one first answer outputted by the trained generator, and outputting, by the output device, the at least one first answer, wherein the trained generator is trained and obtained based on a preset generative adversarial network.

Optionally, the utterance generating device 600 further includes a generative adversarial network constructing module, a data to be trained inputting module, and an alternately training module.

The generative adversarial network constructing module is used for constructing a generative adversarial network based on a training generator and a training discriminator, and an input of the training discriminator is constructed based on an output of the training generator.

The data to be trained inputting module is used for obtaining data to be trained, inputting the data to be trained into the training generator, and obtaining a discrimination result outputted by the training discriminator, wherein the discrimination result is used to indicate a matching degree of the data to be trained.

The alternately training module is used for training alternately the training discriminator and the training generator based on the discriminant result outputted by the training discriminator, until a preset number of training iterations is reached.

Optionally, the data to be trained inputting module includes a second utterance obtaining module, a noise generating module, a second answer generating module, an utterance group grouping module, and a network operating module.

The second utterance obtaining module is used for obtaining a second utterance and at least one second answer associated with the second utterance, wherein the second utterance is an utterance to be trained.

The noise generating module is used for generating at least one random noise.

The second answer generating module is used for inputting the second utterance and the at least one random noise into the training generator, and obtaining at least one third answer outputted by the training generator.

The utterance group grouping module is used for forming a real utterance group based on the second utterance and the at least one second answer, and forming a generated utterance group based on the second utterance and the at least one third answer.

The network operating module is used for inputting the real utterance group and/or the generated utterance group into the training discriminator, and obtaining the discrimination result outputted by the training discriminator.

Optionally, the alternately training module includes a discriminator updating module and a generator updating module.

The discriminator updating module is used for updating parameters of the training discriminator based on a preset stochastic gradient ascend algorithm and the discrimination result outputted by the training discriminator.

The generator updating module is used for updating parameters of the training generator based on a preset stochastic gradient descent algorithm and the discrimination result outputted by the training discriminator.

Optionally, the trained generator includes a preset seq2seq model, the preset seq2seq model comprises an encoder and a decoder. Correspondingly, the first answer generating module 603 includes an encoder operating module, a decoder operating module, and a first answer determining module.

The encoder operating module is used for inputting the first utterance into the encoder, and obtaining an output vector of the encoder.

The decoder operating module is used for inputting the output vector of the encoder and the at least one random semantic vector into the decoder, and obtaining output sequences of the decoder.

The first answers determining module is used for using the output sequences of the decoder as the at least one first answer outputted by the trained generator.

In the embodiment, the training generator and the training discriminator are trained alternately based on the generative adversarial network, the noise space (that is, the noise data) becomes the semantic space (that is, the semantic data) after the training generator is trained. That is, an utterance and a random noise are input into the trained generator, and a meaningful answer that matches the utterance is obtained. The trained generator can be well applied to the chatting human-computer interaction system, and can generate different answers corresponding to the same utterance entered by the user under different situations or contexts, the possibility of generating too many identical answers during the human-machine conversation is effectively reduced, and the fun during the human-machine conversation is enhanced.

Figure 7:
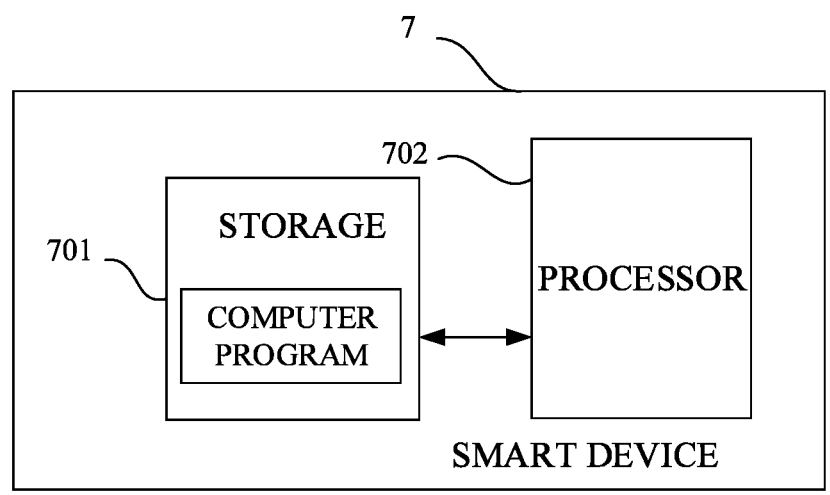
FIG. 7 is a block diagram of one embodiment of a smart device in accordance with the present disclosure.

FIG. 7 is a block diagram of one embodiment of a smart device in accordance with the present disclosure. As shown in FIG. 7, the smart device 7 includes a storage 701, one or more processors 702 (Only one processor is shown in FIG. 7), and one or more computer programs stored in the storage and capable of running on the processor 702. The storage 701 is used for storing software programs and modules, the processor 702 performs various functional applications and data processing by running software programs and modules stored in the memory 701 to obtain resources corresponding to the preset events. Specifically, the processor 702 implements the following steps by running the above computer program stored in the memory 701:

obtaining, by the input device, a first utterance, wherein the first utterance is an utterance to be answered;

generating at least one random semantic vector;

inputting the at least one random semantic vector and the first utterance into a trained generator, and obtaining at least one first answer outputted by the trained generator, wherein the trained generator is trained and obtained based on a preset generative adversarial network; and outputting, by the output device, the at least one first answer.

Assuming the above is the first possible embodiment, in the second possible embodiment based on the first possible embodiment, the processor 702 further implements the following steps by running the above computer program stored in the memory 701:

constructing a generative adversarial network based on a training generator and a training discriminator, wherein an input of the training discriminator is constructed based on an output of the training generator;

obtaining data to be trained, inputting the data to be trained into the training generator, and obtaining a discrimination result outputted by the training discriminator, wherein the discrimination result is used to indicate a matching degree of the data to be trained; and training alternately the training discriminator and the training generator based on the discriminant result outputted by the training discriminator, until a preset number of training iterations is reached.

In the third possible embodiment based on the second possible embodiment, the step of obtaining the data to be trained, inputting the data to be trained into the training generator, and obtaining the discrimination result outputted by the training discriminator, includes:

obtaining a second utterance and at least one second answer associated with the second utterance, wherein the second utterance is an utterance to be trained;

generating at least one random noise;

inputting the second utterance and the at least one random noise into the training generator, and obtaining at least one third answer outputted by the training generator;

forming a real utterance group based on the second utterance and the at least one second answer;

forming a generated utterance group based on the second utterance and the at least one third answer; and inputting the real utterance group and/or the generated utterance group into the training discriminator, and obtaining the discrimination result outputted by the training discriminator.

In the forth possible embodiment based on the second possible embodiment, the step of training alternately the training discriminator and the training generator based on the discriminant result outputted by the training discriminator, includes:

updating parameters of the training discriminator based on a preset stochastic gradient ascend algorithm and the discrimination result outputted by the training discriminator; and updating parameters of the training generator based on a preset stochastic gradient descent algorithm and the discrimination result outputted by the training discriminator.

In the fifth possible embodiment based on the first possible embodiment, the second possible embodiment, the third possible embodiment, or the forth possible embodiment, the above generator (including the trained generator and the training generator) includes a preset seq2seq model including an encoder and a decode.

The step of inputting the at least one random semantic vector and the first utterance into the trained generator, and obtaining the at least one first answer outputted by the trained generator, includes:

inputting the first utterance into the encoder, and obtaining an output vector of the encoder;

inputting the output vector of the encoder and the at least one random semantic vector into the decoder, and obtaining output sequences of the decoder; and using the output sequences of the decoder as the at least one first answer outputted by the trained generator.

In the embodiment, the processor 702 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component.

The storage 701 may include a read-only memory and a random access memory, and provide instructions and data to the processor 702. Some or all of the storage 701 may also include non-volatile random access memory. For example, the storage 701 may also store information of device type.

In the embodiment, the training generator and the training discriminator are trained alternately based on the generative adversarial network, the noise space (that is, the noise data) becomes the semantic space (that is, the semantic data) after the training generator is trained. That is, an utterance and a random noise are input into the trained generator, and a meaningful answer that matches the utterance is obtained. The trained generator can be well applied to the chatting human-computer interaction system, and can generate different answers corresponding to the same utterance entered by the user under different situations or contexts, the possibility of generating too many identical answers during the human-machine conversation is effectively reduced, and the fun during the human-machine conversation is enhanced.

In one embodiment, a non-transitory computer readable storage medium is provided. The non-transitory computer readable storage medium has stored therein instructions, which when executed by a processor, cause the processor to perform the above steps of the computer-implemented method for utterance generation in FIG. 2 to FIG. 5.

A person skilled in the art can clearly understand that for convenience and brevity of descriptions, only the division of each functional module described above is illustrated with examples, in practical applications, the above functions can be allocated by different function modules according to needs, that is, the internal structure of the above device is divided into different function modules to complete all or part of the functions described above. Individual function modules according to the embodiments of the disclosure may be integrated in one processing module, or the modules may exist separately, or two or more modules may be integrated in one module. The foregoing integrated modules may be realized in a form of hardware, or realized in a form of software functional modules. In addition, the specific names of the functional modules are only for the convenience of distinguishing each other, and are not used to limit the protection scope of the application. The specific working process of the modules in the above system can refer to the corresponding process in the embodiment of the above method, and will not be described here in detail.

In the above embodiments, the descriptions of the various embodiments have their respective focuses. For parts that are not detailed or described in a certain embodiment, please refer to related descriptions in other embodiments.

A person skilled in the art will understand that the modules and method steps described in connection with the embodiments disclosed herein can be implemented by electronic hardware or a combination of computer software and electronic hardware. Whether these functions are performed in hardware or software depends on specific applications and design constraints of technical solutions. A professional technical person can use different methods for implementing the described functions for each particular application, but such implementation should not be considered to be beyond the scope of the present invention.

In the embodiments provided by the present disclosure, it should be understood that, the disclosed smart device and method may be implemented in other ways. For example, the described device embodiment is merely exemplary. For example, the division of the modules is merely based on logical functions, and the modules may be divided with other approaches in practice. For example, multiple modules, units or components may be combined, or integrated into another system, or some features can be ignored, or not implemented. In addition, the displayed or discussed mutual coupling or direct coupling or communication connection may be indirect coupling or communication connection through some interfaces, modules or units, which may be electrical, mechanical or other forms.

The modules described as separate components may be or may not be separated physically, the components shown as modules may be or may not be physical modules, i.e., the modules may be located at one place or may be distributed onto multiple network modules. All of or part of the modules may be selected based on actual needs to implement the solutions according to the embodiments of the disclosure.

The modules described as separate components may be or may not be separated physically, the components shown as modules may be or may not be physical modules, i.e., the modules may be located at one place or may be distributed onto multiple network modules. All of or part of the modules may be selected based on actual needs to implement the solutions according to the embodiments of the disclosure.

If the integrated module is implemented in the form of software function module and the software function module is sold or used as separate products, the software function module may also be stored in a non-transitory computer readable storage medium. Based on such understanding, the invention realizes all or part of the flow in the above embodiment method, and can also be accomplished by instructing the relevant hardware through a computer program. The computer software product is stored in a computer readable storage medium, when the computer program is executed by the processor, the steps of the foregoing method embodiments can be implemented. Among them, the computer program includes computer program code, and the computer program code may be in the form of a source code, an object code, an executable file, or some intermediate form, etc. The non-transitory computer readable storage medium includes any entity or device capable of carrying the computer program code, recording medium, USB disk, mobile hard disk, magnetic disk, optical disk, computer memory, read-only memory (ROM), random access memory (RAM), electric carrier signals, telecommunication signals and software distribution medium, etc. It should be noted, the content contained in the non-transitory computer readable medium may be appropriately increased or decreased according to the requirements of legislation and patent practice in the jurisdiction, for example, in some jurisdictions, in accordance with legislation and patent practice, the computer readable media does not include electric carrier signals and telecommunications signals.

As described above, the above embodiments are only used to illustrate the technical solution of the present invention, but not limited. Although the present invention has been described in detail with reference to the foregoing embodiments, those skilled in the art should understand that they can still modify the technical solutions described in the foregoing embodiments, or equivalently replace some of the technical features; and these modifications or replacements do not deviate the essence of the corresponding technical scheme from the spirit and scope of the technical scheme of the embodiments of the present disclosure.

What is claimed is:

1. A computer-implemented method for utterance generation, comprising
    providing a smart device comprising a processor, an input device, and an output device, wherein the processor is electrically coupled to the input device and the output device;
    obtaining, by the input device, a first utterance, wherein the first utterance is an utterance to be answered;
    generating, by the processor, at least one random semantic vector;
    inputting, by the processor, the at least one random semantic vector and the first utterance into a trained generator, and obtaining at least one first answer outputted by the trained generator, wherein the trained generator is trained and obtained based on a preset generative adversarial network by using a second utterance and at least one third answer as an input of a discriminator of the preset generative adversarial network, and the discriminator is trained by using the second utterance, at least one second answer associated with the second utterance, and the at least one third answer as an input of the discriminator, and wherein the second utterance is an utterance to be trained, the at least one third answer is obtained according to at least one random noise and the second utterance, and the at least one random noise is a random semantic vector; and
    outputting, by the output device, the at least one first answer.

2. The method as claimed in claim 1, further comprising:
    constructing, by the processor, a generative adversarial network based on a training generator and a training discriminator, wherein an input of the training discriminator is constructed based on an output of the training generator;
    obtaining, by the processor, data to be trained, inputting the data to be trained into the training generator, and obtaining a discrimination result outputted by the training discriminator, wherein the discrimination result is used to indicate a matching degree of the data to be trained; and
    training alternately, by the processor, the training discriminator and the training generator based on the discriminant result outputted by the training discriminator, until a preset number of training iterations is reached.

3. The method as claimed in claim 2, wherein the step of obtaining, by the processor, the data to be trained, inputting the data to be trained into the training generator, and obtaining the discrimination result outputted by the training discriminator, comprises:
    obtaining, by the processor, the second utterance and the at least one second answer associated with the second utterance;
    generating, by the processor, the at least one random noise;
    inputting, by the processor, the second utterance and the at least one random noise into the training generator, and obtaining the at least one third answer outputted by the training generator;
    forming, by the processor, a real utterance group based on the second utterance and the at least one second answer;
    forming, by the processor, a generated utterance group based on the second utterance and the at least one third answer; and
    inputting, by the processor, the real utterance group and/or the generated utterance group into the training discriminator, and obtaining the discrimination result outputted by the training discriminator.

4. The method as claimed in claim 3, wherein when training the training generator, parameters of the training discriminator are fixed, the generated utterance group is inputted into the training discriminator, and parameters of the training generator are updated based on the discriminant result outputted from the training discriminator; and
    when training the training discriminator, the parameters of the training generator are fixed, the generated utterance group and the real utterance group are inputted into the training discriminator in any order, and the parameters of the training discriminator are updated based on the discriminant result outputted from the training discriminator.

5. The method as claimed in claim 2, wherein the step of training alternately, by the processor, the training discriminator and the training generator based on the discriminant result outputted by the training discriminator, comprises:
    updating, by the processor, parameters of the training discriminator based on a preset stochastic gradient ascend algorithm and the discrimination result outputted by the training discriminator; and
    updating, by the processor, parameters of the training generator based on a preset stochastic gradient descent algorithm and the discrimination result outputted by the training discriminator.

6. The method as claimed in claim 2, wherein the training discriminator comprises at least one utterance matching mode, both the real utterance group and the generated utterance group comprise two utterances; and
    after the utterances of the real utterance group and the generated utterance group are inputted into the training discriminator, a score as the discrimination result is outputted by the training discriminator, and wherein a highest score is 1 indicating that inputted utterances match best, and a lowest score is 0 indicating that the inputted utterances do not match at all.

7. The method as claimed in claim 1, wherein the trained generator comprises a preset seq2seq model comprising an encoder and a decoder; and
    the step of inputting, by the processor, the at least one random semantic vector and the first utterance into the trained generator, and obtaining the at least one first answer outputted by the trained generator, comprises:
    inputting, by the processor, the first utterance into the encoder, and obtaining an output vector of the encoder;

inputting, by the processor, the output vector of the encoder and the at least one random semantic vector into the decoder, and obtaining output sequences of the decoder; and using, by the processor, the output sequences of the decoder as the at least one first answer outputted by the trained generator.

8. The method as claimed in claim 7, wherein the output sequences of the decoder is obtained by adding the at least one random semantic vector to the output vector of the encoder, and a dimension of the at least one random semantic vector is the same as a dimension of the output vector of the encoder; or the output sequences of the decoder is obtained by splicing the at least cane random semantic vector with the output vector of the encoder end-to-end.

9. The method as claimed in claim 1, wherein the step of generating, by the processor, the at least one random semantic vector, comprises:

generating, by the processor, a set of random numbers using a noise generator, and constructing, by the processor, the at least one random semantic vector based on the set of random numbers, wherein a dimension of the random semantic vector is any value, or the dimension of random semantic vector matches a dimension of a target vector corresponding to the first utterance.

10. The method as claimed in claim 1, wherein the trained generator comprises a preset seq2seq model comprising an encoder and a decoder; and when training the training generator, the second utterance is used as an input of the encoder to obtain an output vector of the encoder, the output vector of the encoder and the at least one random noise are used as an input of the decoder to obtain output sequences of the decoder, and the output sequences of the decoder are used as the at least one third answer; and wherein the output sequences of the decoder is obtained by adding the at least one random noise to the output vector of the encoder, and a dimension of the at least one random noise is same as a dimension of the output vector of the encoder; or the output sequences of the decoder is obtained by splicing the at least one random noise with the output vector of the encoder end-to-end.

11. The method as claimed in claim 1, wherein the first utterance is randomly grabbed from an internet, when the smart device is connected to the internet.

12. A smart device, comprising:
one or more processors;
a non-transitory storage; and
one or more computer programs stored in the non-transitory storage and configured to execute a method, the method comprising steps of:
obtaining, by an input device, a first utterance, wherein the first utterance is an utterance to be answered;
generating at least one random semantic vector;
inputting the at least one random semantic vector and the first utterance into a trained generator, and obtaining at least one first answer outputted by the trained generator, wherein the trained generator is trained and obtained based on a preset generative adversarial network by using a second utterance and at least one third answer as an input of a discriminator of the preset generative adversarial network, and the discriminator is trained by using the second utterance, at least one second answer associated with the second utterance, and the at least one third answer as an input of the discriminator, and wherein the second utterance is an utterance to be trained, the at least one third answer is obtained according to at least one random noise and the second utterance, and the at least one random noise is a random semantic vector; and outputting, by an output device, the at least one first answer.

13. The smart device as claimed in claim 12, the method further comprises:

constructing a generative adversarial network based on a training generator and a training discriminator, wherein an input of the training discriminator is constructed based on an output of the training generator;

obtaining data to be trained, inputting the data to be trained into the training generator, and obtaining a discrimination result outputted by the training discriminator, wherein the discrimination result is used to indicate a matching degree of the data to be trained; and training alternately the training discriminator and the training generator based on the discriminant result outputted by the training discriminator, until a preset number of training iterations is reached.

14. The smart device as claimed in claim 13, wherein the step of obtaining the data to be trained, inputting the data to be trained into the training generator, and obtaining the discrimination result outputted by the training discriminator, comprises:

obtaining all the second utterance and the at least one second answer associated with the second utterance, wherein the second utterance is an utterance to be trained;

generating the at least one random noise;

inputting the second utterance and the at least one random noise into the training generator, and obtaining the at least one third answer outputted by the training generator;

forming a real utterance group based on the second utterance and the at least one second answer;

forming a generated utterance group based on the second utterance and the at least one third answer; and inputting the real utterance group and/or the generated utterance group into the training discriminator, and obtaining the discrimination result outputted by the training discriminator.

15. The smart device as claimed in claim 13, wherein the step of training alternately the training discriminator and the training generator based on the discriminant result outputted by the training discriminator, comprises:

updating parameters of the training discriminator based on a preset stochastic gradient ascend algorithm and the discrimination result outputted by the training discriminator; and updating parameters of the training generator based on a preset stochastic gradient descent algorithm and the discrimination result outputted by the training discriminator.

16. The smart device as claimed in claim 12, wherein the trained generator comprises a preset seq2seq model comprising an encoder and a decoder; and the step of inputting the at least one random semantic vector and the first utterance into the trained generator, and obtaining the at least one first answer outputted by the trained generator, comprises:

inputting the first utterance into the encoder, and obtaining an output vector of the encoder;

inputting the output vector of the encoder and the at least one random semantic vector into the decoder, and obtaining output sequences of the decoder; and using the output sequences of the decoder as the at least one first answer outputted by the trained generator.

17. The smart device as claimed in claim 12, wherein the step of generating the at least one random semantic vector, comprises:

generating a set of random numbers using a noise generator, and constructing the at least one random semantic vector based on the set of random numbers, wherein a dimension of the random semantic vector is any value, or the dimension of random semantic vector matches a dimension of a target vector corresponding to the first utterance.

18. A non-transitory computer readable storage medium having stored therein instructions, which when executed by a processor, cause the processor to:

obtain, by an input device, a first utterance, wherein the first utterance is an utterance to be answered;

generate at least one random semantic vector;

input the at least one random semantic vector and the first utterance into a trained generator, and obtaining at least one first answer outputted by the trained generator, wherein the trained generator is trained and obtained based on a preset generative adversarial network by using a second utterance and at least one third answer as an input of a discriminator of the preset generative adversarial network, and the discriminator is trained by using the second utterance, at least one second answer associated with the second utterance, and the at least one third answer as an input of the discriminator, and wherein the second utterance is an utterance to be trained, the at least one third answer is obtained according to at least one random noise and the second utterance, and the at least one random noise is a random semantic vector; and output, by an output device, the at least one first answer.

19. The non-transitory computer readable storage medium as claimed in claim 18, wherein when the instructions are executed by the processor, further cause the processor to:

construct a generative adversarial network based on a training generator and a training discriminator, wherein an input of the training discriminator is constructed based on an output of the training generator;

obtain data to be trained, input the data to be trained into the training generator, and obtain a discrimination result outputted by the training discriminator, wherein the discrimination result is used to indicate a matching degree of the data to be trained; and train alternately, by the processor, the training discriminator and the training generator based on the discriminant result outputted by the training discriminator, until a preset number of training iterations is reached.

20. The non-transitory computer readable storage medium as claimed in claim 19, wherein when the instructions are executed by the processor, further cause the processor to:

obtain the second utterance and the at least one second answer associated with the second utterance;

generate the at least one random noise;

input the second utterance and the at least one random noise into the training generator, and obtain the at least one third answer outputted by the training generator;

form a real utterance group based on the second utterance and the at least one second answer;

form a generated utterance group based on the second utterance and the at least one third answer; and input the real utterance group and/or the generated utterance group into the training discriminator, and obtain the discrimination result outputted by the training discriminator;

wherein when training the training generator, parameters of the training discriminator are fixed, the generated utterance group is inputted into the training discriminator, and parameters of the training generator are updated based on the discriminant result outputted from the training discriminator;

when training the training discriminator, the parameters of the training generator are fixed, the generated utterance group and the real utterance group are inputted into the training discriminator in any order, and the parameters of the training discriminator are updated based on the discriminant result outputted from the training discriminator; and wherein the training discriminator comprises at least one utterance matching mode; and after the second utterance and the second answer of the real utterance group, and the second utterance and the third answer of the generated utterance group, as the utterances, are inputted into the training discriminator, a score is outputted by the training discriminator, and wherein a highest score is 1, indicating that inputted utterances match best, and a lowest score is 0, indicating that the inputted utterances do not match at all.

\* \* \* \* \*